United States Patent [19]
Minamibayashi et al.

[11] 4,288,820
[45] Sep. 8, 1981

[54] TIME-AXIS PICTURE-SIGNAL CONVERTER FOR FACSIMILE AND THE LIKE

[75] Inventors: Seisaku Minamibayashi; Takashi Ishikawa; Takashi Ogawa, all of Tokyo, Japan

[73] Assignee: Nippon Electric Co. Ltd., Tokyo, Japan

[21] Appl. No.: 152,781

[22] Filed: May 23, 1980

[30] Foreign Application Priority Data

May 24, 1979 [JP] Japan .................................. 54/64254

[51] Int. Cl.³ .............................................. H04N 1/40
[52] U.S. Cl. .................... 358/280; 358/293; 358/294
[58] Field of Search ........................ 358/280, 293, 294

[56] References Cited

U.S. PATENT DOCUMENTS 3,752,912  8/1973  Ohsawa ............................... 358/280
3,800,080  3/1974  Fuwa ................................... 358/280
4,081,843  3/1978  Okano .................................. 358/294

OTHER PUBLICATIONS

*NEC Technical Journal*, No. 126, pp. 30–33, "NEFAX--3500, New Model, Medium Speed Facsimile NEFAX--3500".

*Primary Examiner*—Howard Britton
*Attorney, Agent, or Firm*—Laff, Whitesel & Rockman

[57] ABSTRACT

For a medium- or low-speed facsimile, a solid-state image sensor is now usable and scans each line on the sheet a plurality of times for a one-scan-line picture signal output to the circuit line. The sensor output, of high bit rate, is distributed alternately to a pair of analog memory devices and the contents of the memory devices are read out alternately therefrom at low rate in a manner such that the picture signal blocks in each of the multiple one-line segment from the image sensor are joined with each other to form an expanded one-scan-line picture signal for line transmission. A reference signal for signal level restoration is inserted during the read-out period of the memory devices. Because of this, the length of time that the picture signal stays in the memory devices is reduced to decrease the influence of the noise component arising therein and also the number of memory elements of the memory devices can be reduced to further decrease the noise influence.

3 Claims, 8 Drawing Figures $$\begin{pmatrix} \text{FREQUENCE}: f_n \quad \text{CYCLE TIME}: t_n \\ \text{FREQUENCE}: f_m \quad \text{CYCLE TIME}: t_m \end{pmatrix}$$

TIME-AXIS PICTURE-SIGNAL CONVERTER FOR FACSIMILE AND THE LIKE

BACKGROUND OF THE INVENTION

1. Field of the Invention

This invention relates to analog picture signal converters for facsimile and the like apparatus and more particularly to those of the type capable of time-axis conversion of the picture signal output of a solid-state image sensor.

2. Description of the Prior Art

Solid-state image sensors, including a large number of photosensor elements arranged unidimensionally over a definite length and an analog shift register for taking out the electric charges stored in the respective sensor elements, are employed in high-speed facsimile transmitters, OCRs, etc., as they are capable of obtaining picture-signal segments, as produced by the optical line-by-line scanning of the original picture, by electronic scanning.

However where a solid-state image sensor is applied to a so-called medium-speed or low-speed facsimile system, the picture signal output of the image sensor needs to be subjected to time-axis conversion before it is sent into the circuit line because of certain characteristics inherent in such image sensor.

In other words, since the sensing region of a solid-state image sensor functions in a thermally non-equilibrium state to store therein electric charges as picture-signal elements, such picture-signal elements must be obscured by thermal noise unless the charges stored in the respective sensor elements are transferred to the analog shift register before the sensor attains a thermally equilibrium state. The period or cycle time of a gate signal for such charge transfer is usually of the length of several tens msec or less and, accordingly, the picture signal is fed with such length of period.

On the other hand, in a medium- or low-speed facsimile, the scanning period of the picture signal to be sent out into the circuit line is determined in the range of from 80 msec to 350 msec as required under the bandwidth, image resolution and other circuit line conditions and, therefore, the picture signal cannot be sent out into the circuit line in the form as outputted from the solid-state image sensor.

Under the circumstances, it is considered that, if for the purpose of time-axis conversion of the picture signal, use can be made of a charge transfer device (CTD) such as a bucker-brigade device (BBD) or a charge-coupled device (CCD) as an analog shift register, the time-axis conversion of the graduated picture signal will be effected much more economically and compared with the case in which a digital memory is employed.

In this connection, in the article entitled "New Model Medium-Speed Facsimile NEFAX-3500" (in Japanese), the NEC TECHNICAL JOURNAL, No. 126, pp. 30–33 (Dec. 25, 1978), it is disclosed that "the output of the image sensor is stored at high speed in an analog shift register and read out thereof at a speed corresponding to the main scanning frequency", suggesting a technique employing an analog memory device for time-axis conversion of the picture signal from an image sensor.

In the use of a CTD, however, in which the picture signal input is stored within a semiconductor substrate as a succession of electric charges which are sequentially transferred, it is required that, to improve the signal-to-noise ratio, such signal be outputted from the CCD as soon as possible before the latter attains a thermally equilibrium state, as with the case explained above in connection with a solid-state image sensor. This means that, in order to realize the desired delaying, expansion or compression of the signal, it is necessary to provide some means for enabling the signal processing to be effected while the influence thereon of thermal noise is still limited.

Further, in the CTD, usually there exist some variations in characteristic between its elements and at least a few of such elements exhibit a dark current spike of substantial magnitude, necessitating some measure obviate the influence of such spiky dark current.

SUMMARY OF THE INVENTION

Under these circumstances, the present invention has for its primary object the provision of a time-axis converter of the type concerned which includes a charge transfer device (CTD) and is designed to minimize the influence of noise components occurring therein.

Another object of the present invention is to provide a time-axis converter of the character described which is made free from any influence of dark current spikes deriving from variations in characteristic between the CTD elements.

Yet another object of the present invention is to provide a time-axis converter of the character described which is capable of correcting the change in signal level occurring in the process of time-axis conversion of the picture signal to obtain a d-c restored picture signal.

According to the present invention, there is provided a time-axis converter for a facsimile or the like apparatus of the type in which a high-speed analog picture signal from a solid-state image sensor consisting of a succession of one-line segments each including a blanking period is converted by means of an analog memory device into an analog picture signal of one-scan lines suited to the transmission rate of the circuit line, said converter being characterized in that it comprises: first clock means for producing a high-speed clock of the rate corresponding to the picture-signal output rate of the solid-state image sensor; second clock means for producing a low-speed clock of the rate corresponding to the transmission rate of the circuit line; first counter means for counting the high-speed clock pulses from the first clock means and adapted to be reset at a specified full count; second counter means for counting low-speed clock pulses from the second clock means and adapted to be reset at the same full count as that of the first counter means; means for producing a switching signal each time the output indications of the first and second counter means coincide with each other; a pair of analog memory devices having a predetermined number of memory elements for delaying and expanding the high-speed picture signal; means for distributing the high-speed picture signal alternately to one and the other of the analog memory devices under the control of the switching signal; means for reading out the output signal of the analog memory devices under the control of the switching signal alternately as the distribution of the high-speed picture signal to one or the other of the analog memory devices is interrupted; and shift-pulse feeding means coupled to each of the analog memory devices for shifting the contents of the memory elements of the analog memory device alternately at the rates of the high-speed and low-speed clocks, the switching between the high-speed and low-speed clocks being effected under the control of the switching signal from the high-speed to the low-speed clock each time the supply of the high-speed picture signal to the analog memory device is started and from the low-speed to the high-speed clock each time such signal supply to the analog memory device is interrupted.

The above and other objects, features and advantages of the present invention will become more apparent from the following description when taken in conjunction with the accompanying drawings.

DESCRIPTION OF THE PREFERRED EMBODIMENT

Figure 1A:
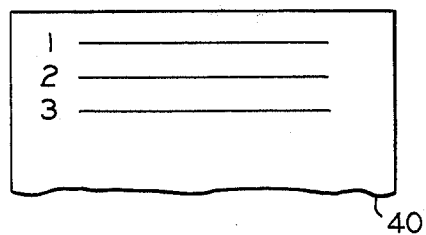
FIGS. 1a and 1b are plan views explanatory of some of the principles of the present invention underlying a form of practical embodiment thereof.

Referring first to FIG. 1a, lines 1, 2, 3, ... represent scan lines of the density of 3.85 mm on the original sheet of size B6 of the Japanese Industrial Standards (JIS). By sending into the circuit line a picture signal formed of one-scan lines, each for one of the scan lines 1, 2, 3, ... , at a main scan period of 83.3 msec (i.e., 720 lines per minute), a so-called medium-speed facsimile system is realizable, at the receive side of which the picture is reproduced directly upon reception of the picture signal.

Figure 1B:
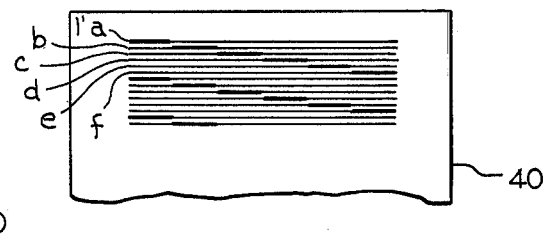

However, in cases where a solid-state image sensor is employed as an image pick-up device, the scan period $T_1$ of the image sensor cannot be made longer than several tens msec on account of the noise influence involved. Accordingly, where the scan period of the image sensor is 15.15 msec and the original sheet is fed at a fixed speed in the auxiliary scan direction, it is noted that the line scan of such image sensor is repeated 5.5 times for each scan line outputted to the circuit line, as seen in FIG. 5b. It follows, therefore, that the desired picture reproduction can be effected by transmitting scan lines, each for 5.5 scan lines of the image sensor indicated by thin lines in FIG. 1b, at a rate corresponding to the transmission rate of the circuit line only in the form subjected to time-axis conversion. According to the present invention, the thick-line segment of each of the scan lines of the image sensor, which are indicated by then lines in FIG. 1b, is subjected to time-axis conversion in an analog memory device and the scan-line segments so processed are joined with each other in succession to form a one-scan-line picture signal to be sent out into the circuit line so that any influence of the noise component deriving from the analog memory device can be minimized. It is noted that the picture signal constructed in this manner is substantially the same as one line segment of picture signal picked up by the CCD image sensor owing to the relatively high scan-line density of the CCD image sensor itself and to the characteristic features of facsimile pictures in general.

Figure 2:
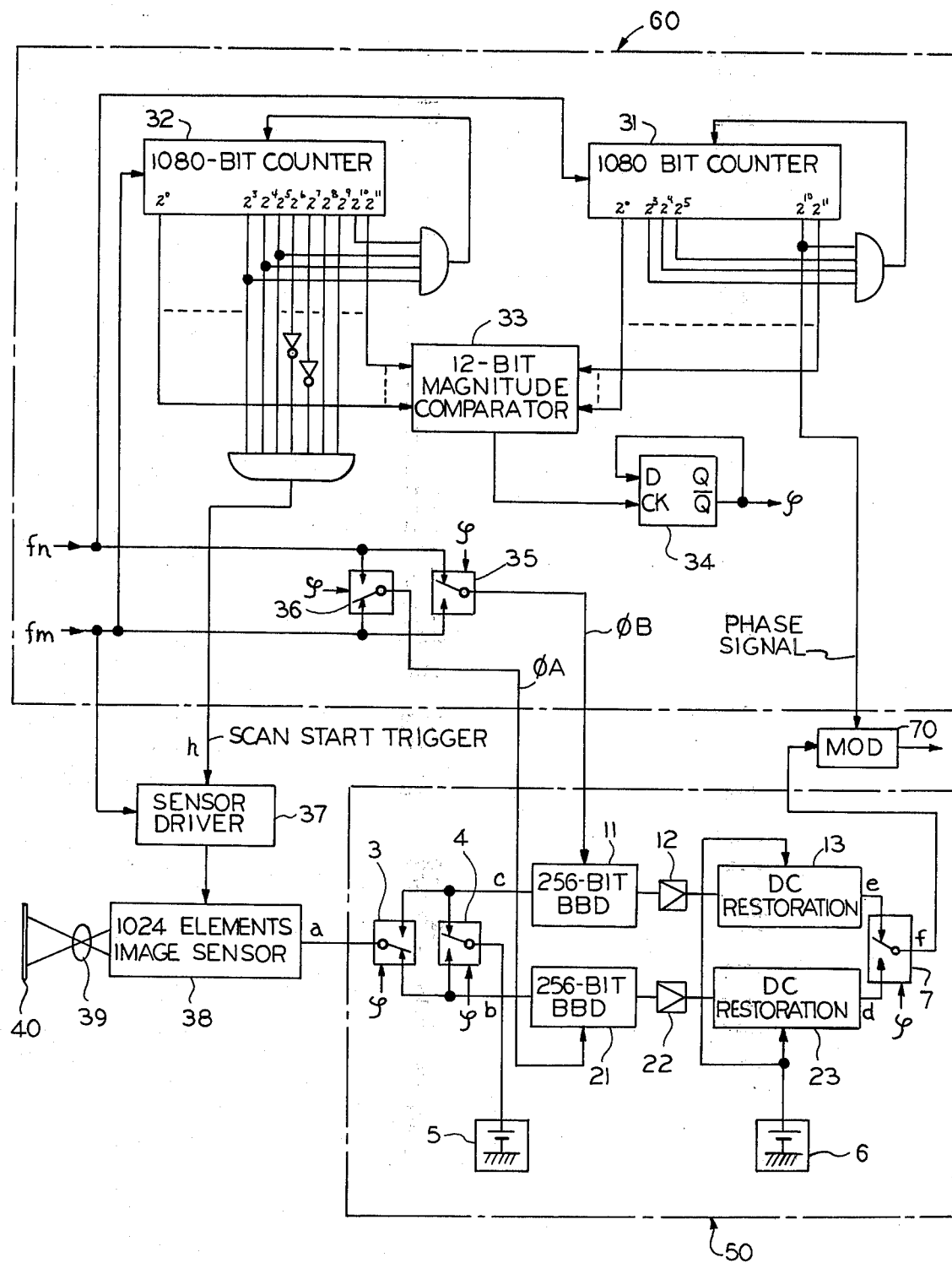
FIG. 2 is a block diagram illustrating a form of preferred embodiment of the invention.

Referring next to FIG. 2, the preferred embodiment of the present invention illustrated therein includes a CCD image sensor 38, a time-axis converter 50 for effecting rate conversion of the picture signal from the image sensor 38, and a control section 60. An original sheet 40 is focused through a lens 39 upon the CCD image sensor 38, having 1024 sensor elements, where the picture information elements for one scan length are simultaneously subjected to photoelectric conversion in accordance with the reflected light intensity and then stored and transferred under the control of a sensor drive 37 so that the line segments of picture signal are outputted in time-sequential fashion.

The control section 60 includes two 1080-bit binary counters 31 and 32, a 12-bit magnitude comparator 33 for comparing all the output bits of the two counters, a flip-flop 34 and clock switching circuits 35 and 36.

High-speed clock pulses $f_m$, corresponding to the output rate of high-speed picture signal of the solid-state image sensor 38, are fed to the sensor driver 37 to form therein a control signal to be fed to the CCD image sensor 38. The high-speed clock pulses $f_m$ are also fed to the counter 32, which is reset each time a full count of 1080 is reached and the output count of which represents the address of picture elements in each segment of the output picture signal from the CCD image sensor 38. In connection with the picture-element address, it is to be noted that a scan start signal h is fed to the sensor driver 37 at the 824-th pulse of the high-speed clock, that is, 256 pulses before the output bits of the counter 32 represent "0" all at the same time whereby the first picture element of the high-speed picture signal output of the image sensor, as delayed by a 256-bit CTD, corresponds to the "0" address of the counter 32, as will be described later in detail.

Clock pulses $f_n$ form a low-speed clock corresponding to the transmission rate of the circuit line and are applied to the other counter 31, which counts up to 1080, to indicate what number of picture element in the scan line is now being sent into the circuit line.

It will be noted, that the counter 32 indicates the address of the high-speed output picture elements of the image sensor 38 as delayed by CTD while the counter 31 indicates the address of the low-speed output picture elements being sent into the circuit line.

The 12-bit magnitude comparator 33 compares the output bits of the two counters 31 and 32 and sends a trigger signal to the flip-flop 34 when all the output bits of the two counters become the same. As for such state of bit coincidence between the two counters, description will next be made in detail.

In the embodiment illustrated, a high-speed picture signal is read out of the image sensor at the frequency $f_m = 71.28$ KHz and, on the other hand the picture signal is sent out into the circuit line at $f_n = 12.96$ KHz. In other words, the length of period $T_1$ in which the image sensor scans a single line and outputs one line sigment of picture signal is 15.15 msec while the length of period $T_2$ required for one scan line to be sent out into the circuit line at a frequency suited thereto is 83.3 msec.

Since the original sheet 40 is fed in the direction of auxiliary scan at a fixed speed, it is noted that, during the time that one scan line is sent out into the circuit line, the CCD image sensor outputs substantially the same form of picture signal 5.5 times, as indicated in FIG. 1b by thin lines.

Figure 3:
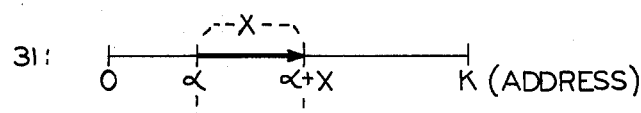
FIG. 3 is a diagram explanatory of the relationship between the indications and the count numbers of the two counters shown in FIG. 2.
Figure 3:
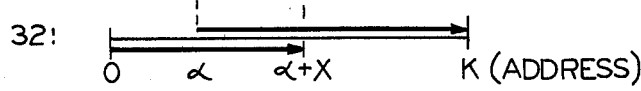

Referring to FIG. 3, during the time interval between a point of time when all the output bits of the two counters 31 and 32 coincide, for example, at the counter indication of α and another point of time when they coincide again, the counter 32, the full count K of which is 1080 counts (K+x) bits to indicate (α+x) while the counter 31 counts x bits to indicate (α+x). Generally, during the time between a first point of time of bit coincidence and the m-th point of time of bit coincidence (mx<K), the counter 31 (α+mx) bits while the counter 32 counts m(K+x) bits, both counters finally indicating (α+mx).

In other words, as the CCD image sensor outputs a one-line segment of K bits at high rate, only a bit block of x consecutive bits is taken out of the line segment as a picture signal to be transmitted through the circuit line and, subsequently, as the CCD image sensor outputs the second one-line segment of the same picture information, only an x-bit block appearing in the second segment in the position next to that of the previously taken x-bit block is taken out as a picture signal for line transmission. In this fashion, a signal block of x bits is extracted from the one-line segment of picture signal each time the indications of the two counters 31 and 32 coincide. Such signal blocks are successively joined with each other to form a one-line-scan picture signal of K bits for line transmission. The process of forming such picture signal will be made more apparent in connection with the time-axis converter 50, which will be described later in detail.

Referring again to FIG. 2, the flip-flop 34 produces a switching signal φ each time the 12-bit magnitude comparator outputs a coincidence pulse to the flip-flop as a trigger signal therefor. The switching signal φ is utilized for the switching of clock switching circuits 35, 36 and that of switch circuits 3, 4 and 7 provided in the time-axis converter 50, as will be described later in detail.

The high-speed and low-speed clock pulses $f_m$ and $f_n$ are both connected to the clock switching circuits 35 and 36, which produce under the control of the switching signal φ shift-pulse signals $\phi_A$ and $\phi_B$, respectively, in alternate fashion, and which signals are fed to analog memory devices 11 and 21, respectively. As regards the control signals, $f_m$, $f_n$, φ, $\phi_A$ and $\phi_B$, referred to above and indicated in FIGS. 2 and 4, it is to be noted that the signal φ is reversed regularly at times $t_1, t_2, \ldots, t_6$, as shown in the time chart of FIG. 4, so that shift-pulse signals $\phi_A$ and $\phi_B$ are changed from high-speed shift ($f_m$) to low-speed shift ($f_n$) and from low-speed shift ($f_n$) to high-speed shift ($f_m$) alternately with each other.

The time-axis converter 50 includes, in addition to the pair of BBD analog memory devices 11 and 21, a reference-voltage generating circuit 5, a pair of d-c amplifiers 12 and 22, a pair of level restoration circuits 13 and 23, and a level-voltage generating circuit 7. The analog memory devices 11 and 21 have each 256 memory elements and are connected to one or the other of two fixed contacts of respective switch circuits 3 and 4, which are connected to the CCD image sensor 38 and reference-voltage generating circuit 5, respectively.

The switch circuit 3 serves under the control of switching signal φ to feed the picture signal from CCD image sensor 38 alternately to the analog memory devices 11 and 21. The switch circuit 4 serves under the control of switching signal φ to feed a reference level signal of fixed voltage level $E_0$ alternately to one or the other of analog memory devices 11 and 21 when that device 11 or 21 is being fed with no picture signal. The voltage $E_0$ is set at a level lower than the noise level of the CCD image sensor during the blanking period.

Figure 4:
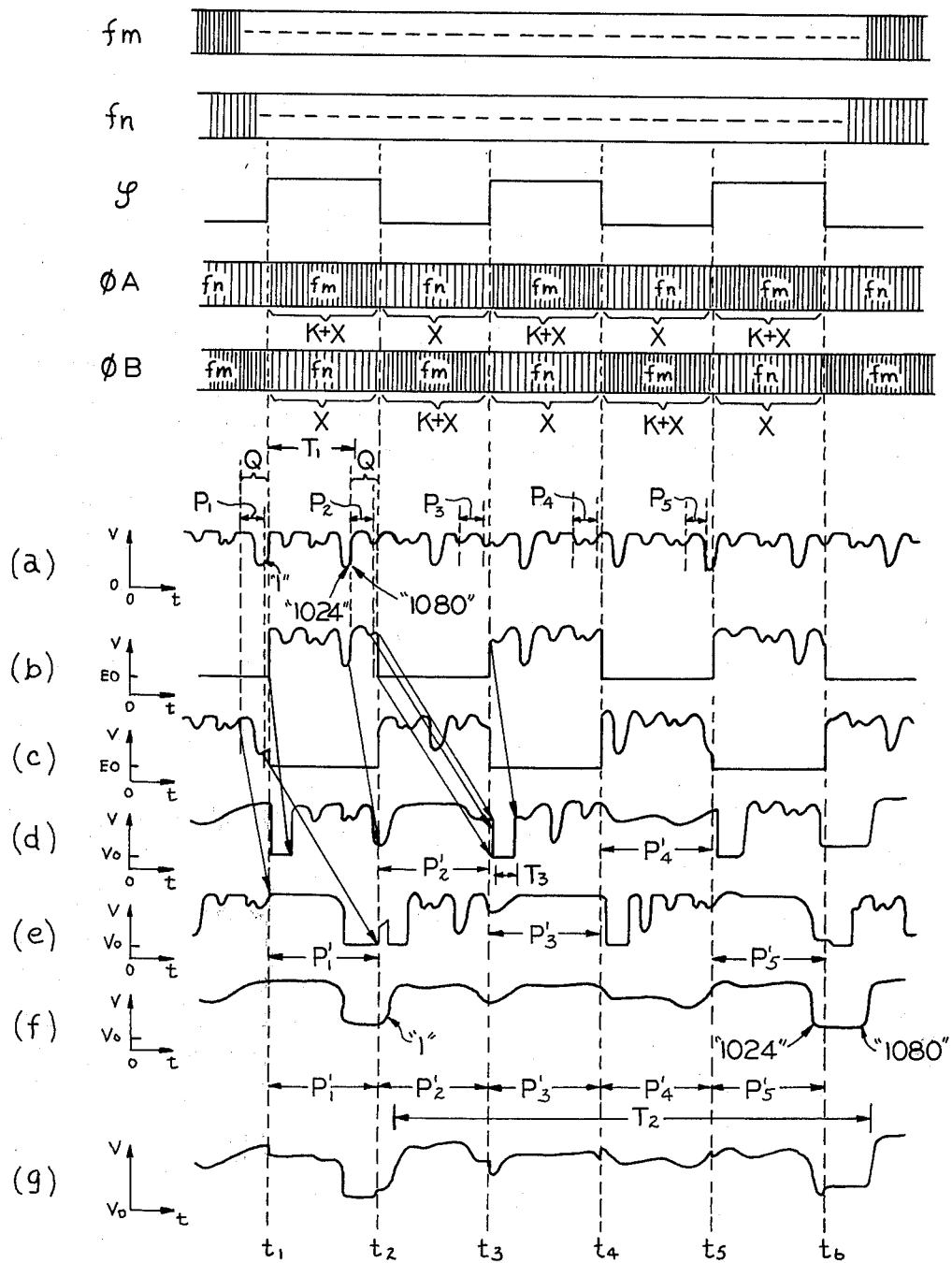
FIG. 4 is a time chart illustrating the control signals, the picture signal from the image sensor, the picture signal to be delivered to the circuit line and other signal forms appearing in the embodiment shown in FIG. 2.

The sensor driver 37, receiving scan start signal h from the counter 32, controls the CCD image sensor 38 so that the latter produces an analog picture signal (a) at scan periods $T_1$ and bit rate $f_m$ (FIG. 4). Referring to FIG. 4, in the section $t_1$–$t_2$, the scan period $T_1$ consists of a picture-signal period including bits "1" to "1024" and a blanking period of bits "1025" to "1080". During the blanking period, the noise level of the image sensor is out-putted. Assumiing that the contacts of switch circuits 3 and 4 are positioned as shown in FIG. 2 at the point of time $t_1$, the input signal to the analog memory device 21 includes, as shown in FIG. 4 at (b), a picture signal of (K+x) bits (x here is 240) in section $t_1$–$t_2$, a reference-level signal of x bits in section $t_2$–$t_3$ and succeeding alternate (K+x)-bit picture and x-bit reference-level signals. The picture signal input to the analog memory device 21 during the section $t_1$–$t_2$ forms a corresponding signal output of the memory device with a delay of $Q \cdot t_m$, that is, the product of memory capacity Q(=256) of the memory device 21 and high-speed clock pulse period $t_m$. At point of time $t_2$ when (K+x−Q) bits have been read out of the memory device, leaving Q bits therein unread, the shift pulse rate is changed to the low-speed clock rate $f_n$ and, subsequently, a picture signal block of x bits is read out at the low-speed clock rate in the form extended into the neighboring section $t_2$–$t_3$. The remaining (Q−x) bits of picture signal, written in the memory device 21 in section $t_1$–$t_2$, are delayed by a length of time of {(Q−x)$t_m$+x·$t_n$} ($t_n$ representing the period of low-speed clock $f_n$) to be read out, starting at the point of time $t_3$.

The reference-voltage signal $E_0$ of x bits, written in the memory device 21 in section $t_2$–$t_3$ is delayed by the sum of x·$t_n$ and (Q−x)$t_m$ to be read out, starting at the point of time {$t_3$+(Q−x)$t_m$}, at the high-speed clock rate $f_m$, thus forming an output compressed from x·$t_n$ to x·$t_m$ (=$T_3$). In section $t_3$–$t_4$, first (K+x−Q) bits of the picture signal of (K+x) bits, written in the memory device 21 in this section, are outputted with a delay of Q·$t_m$, following the compressed reference signal $E_0$. Further successions of signal bits are processed in order in substantially the same manner described above; namely, the following (K+x−Q)-bit and (Q−x)-bit picture signal blocks are outputted simply with delay time, the next following x-bit picture signal block is outputted in the form expanded from x·$t_m$ to x·$t_n$, and then an x-bit reference voltage signal in the compressed form. In this manner, the analog memory device 21 produces a picture signal output in the form indicated at (d) in FIG. 4.

Similarly, the analog memory device 11, being fed with a picture signal (c) formed of alternate successions of reference and picture signal bits, produces an output signal in the form shown at (e) in FIG. 4.

The writing and reading operation of the analog memory devices will next be described in detail in physical terms.

In the state of analog memory device 21 having (Q−x) information bit left therein, that is, when first (K+x−Q) bits and then x bits of a (K+x)-bit picture signal written in the analog memory device have been read out at the respective rates of high-speed and low-speed clock pulses $f_m$ and $f_n$, the next line segment of picture signal starts to be written in the other analog memory device 21 at high rate to be outputted therefrom. Then, at the point of time when the address of the output picture signal of analog memory device 21 and that of the output picture signal of analog memory device 11 coincide, that is, when the indications of counters 31 and 32 coincide with each other, the switch circuits 3, 4 and 7 are transferred so that the picture signal is read out of the analog memory device at the low-speed clock rate. It will be noted at this point that the picture signal is being at all times successively shifted within the analog memory devices and, as a consequence, its noise components deriving from the individual memory elements are effectively averaged.

As regards the expanded form of picture signal, blocks $P_2$ and $P_4$ of picture signal (a) are expanded to $P_2'$ and $P_4'$, respectively, as shown at (d) in FIG. 4, before they are outputted from the analog memory device 21. On the other hand, signal blocks $P_1$, $P_3$ and $P_5$ are outputted from the analog memory device 11 in the form expanded to $P_1'$, $P_3'$ and $P_5'$, respectively, as shown at (e) in FIG. 4.

Referring again to FIG. 2, the output signals of analog memory devices 11 and 21 are adjusted to a predetermined amplitude by the d-c amplifiers 13 and 23, respectively, and, after being subjected to the level restoring action of the respective level restoration circuits 13 and 23, are led alternately to a modulator 70 through the switch circuit 7.

In this connection, it is to be noted that, as the switch circuit 7 is reversed under the control of switching signal $\phi$, the picture signals from the two analog memory devices are taken out alternately only in the expanded form of picture signal block together to form a one-line-scan picture signal output which complies with the circuit line of K-bit period $T_2$.

The counter 31, which indicates the address of each picture element in a scan line, feeds to the modulator 70 a control signal for insertion of a phase signal at the 1024-th picture element of the scan line so that the 1025-th through 1080-th bits of the latter are blocked. In this manner, the length of section corresponding to the blocked bits represents a phase signal inserted. As will be apparent, when the one-scan-line picture signal has been sent out as described above, the same process of picture construction is started to form a picture signal output for the next scan line.

Figure 5:
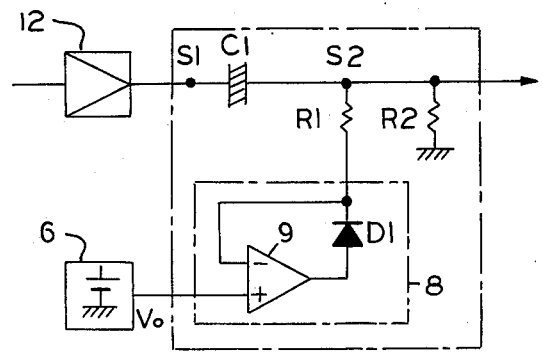
FIG. 5 is a circuit diagram illustrating a form of d-c restoration circuit usable in the embodiment of the invention.

Referring to FIG. 5, the level restoration circuit 13 includes a capacitor $C_1$ and a resistance $R_2$ connected in series thereto, and a series connection of a resistance $R_1$, an ideal rectifier circuit 8 and a voltage generating circuit 6 for producing a restoration-level voltage $V_0$ is connected in parallel with the resistance $R_2$. The ideal rectifier circuit 8 includes an operational amplifier 9 and a diode $D_1$ connected between the output and inverted terminals of the amplifier and exhibits a rectifier characteristic linear with respect to the restoration level voltage $V_0$, which is fed to the non-inverted terminal of the amplifier 9. The resistance $R_1$ serves to prevent the ideal rectifier circuit 8 from responding to any spiky noise. The resistance $R_2$, provided for discharging the capacitor $C_1$, is so set as to give a time constant $R_2 C_1$ much larger than the time length of compressed reference signal, $T_3$.

The output signals (d) and (e) of respective analog memory devices 21 and 11 are each level-shifted relative to the black level as the noise returned from each memory element to the dark current is added to the signal each time the signal is shifted within the memory device and subsequently when the signals are d-c amplified by the respective amplifiers 22 and 12. Because of this, if such level-shifted signals are synthesized to form a one-line-scan signal with no level restoration, the signal blocks cannot be joined smoothly and the resulting picture signal must include gaps or steps each at the junction of two adjacent blocks, as shown at (g) in FIG. 4. Even in cases where the analog memory devices and the d-c amplifiers are of uniform characteristics, the picture signal is subjected to some level shift, necessitating level restoration thereof for high-fidelity picture signal transmission.

Figure 6:
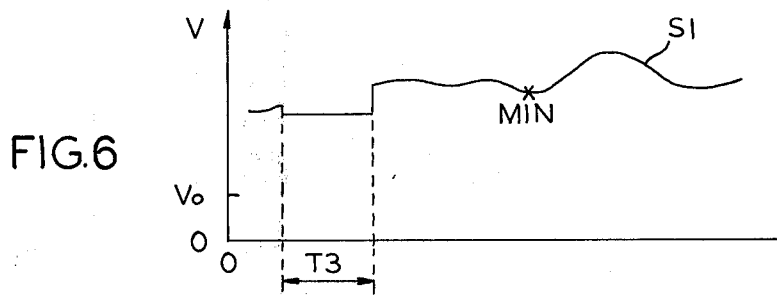
FIG. 6 is a time chart of the signal input to the d-c restoration circuit.
Figure 7:
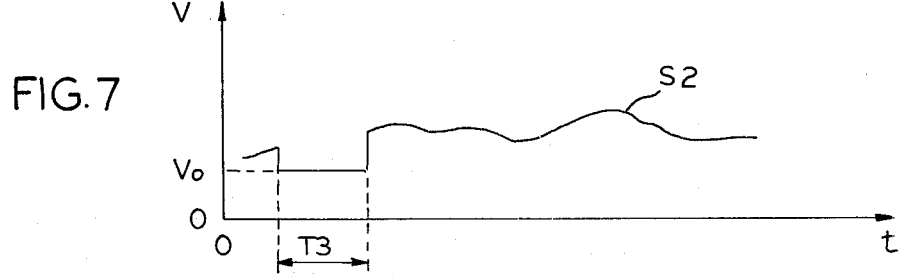
FIG. 7 is a time chart of the signal output of the d-c restoration circuit.

FIG. 6 illustrates the d-c amplified form $S_1$ of the picture signal output (e) of FIG. 4, which includes compressed-reference-signal section $T_3$. The d-c component of such signal $S_1$ is blocked by capacitor $C_1$ and only an a-c signal output based upon a reference level of zero voltage is formed. On this occasion, though the potential of the reference signal must fall below zero volt when passed, the ideal rectifier circuit 8 serves to charge the capacitor $C_1$ so that the output terminal of the latter is held at $V_0$ during the reference-signal section $T_3$ and a restored signal is produced with the minimum voltage $V_0$ as shown at $S_2$ in FIG. 7. In this manner, the restored signal $S_2$ is a signal d-c restored to the level of restoration $V_0$.

The level restoration circuit 23, of quite the same structure as that shown in FIG. 5, serves for level restoration of the picture signal output (d) to the level $V_0$.

It will be appreciated, therefore, that the synthesized one-scan-line picture signal output is in the form of a high-fidelity gradated signal including signal blocks smoothly joined with each other, as illustrated at (f) in FIG. 4.

As will be apparent from the foregoing description, according to the present invention, two analog memory devices are switched in alternate fashion and the time period in which the rate-converted picture signal is read out thereof is fully utilized as the reference signal for signal level restoration is inserted in the read-out period and taken out in the write-in period of the converted picture signal.

Further, according to the present invention, correction of level variations deriving from the dark current in the analog memory devices and time-axis conversion of the picture signal can be performed simultaneously to obtain the desired one-scan-line picture signal.

Moreover, as the two analog memory devices are switched in alternate fashion, the picture signal blocks in each of the multiple one-line segments from the CCD image sensor area successively joined with each other to form an expanded one-scan-line picture signal so that not only the length of time that the picture signal stays in the analog memory devices can be substantially reduced but the influences of the noise component as added to the signal in the analog memory devices can be materially reduced.

Further, in the present invention, reduction in length of scanning period of the CCD image sensor results in reduction in the influence of the noise component within the CCD image sensor and also enables formation of a one-scan-line picture signal including an increased number of signal blocks, thus allowing reduction in number of memory elements in each of the analog memory devices and hence in amount of the noise arising therein.

Furthermore, according to the present invention, since the picture signal is consecutively shifted at all times within the analog memory devices, never staying in any element thereof, the dark current due to variations in characteristics of the memory elements are added up element by element and never take any spiky form, enabling elimination of the dark-current component of the signal by d-c level-restoration technique.

Though, in connection with the embodiment illustrated, the CCD image sensor has been described as including 1024 of photosensor elements, it will be apparent to those skilled in the art that the number of memory elements is not to be so limited but may be varied as desired, for example, to 2048 thereby to meet the specifications of the CCITT.GII Standards.

Further, though, in the embodiment illustrated, the original sheet 40 has been described as being fed at a fixed speed continuously in the direction of auxiliary scan, it will be apparent that it may alternatively be fed in the direction by step pulse means in synchronism with the scanning operation at the frequency of scan lines to be sent out into the circuit lines so that a one-scan-line picture signal is obtained in the form of a succession of picture signal blocks taken out of the respective line segments obtainable as the same line region of the original sheet is scanned a number of times by the image sensor.

It will also be apparent in this connection that use may be made of such line segments from the CCD image sensor as obtained by feeding the sheet by step pulse means a plurality of times within each scan line period at intervals smaller than the scan line spacing of the restored picture signal.

What is claimed is:

1. A time-axis converter for a facsimile or the like appartus of the type in which a high-speed analog picture signal from a solid-state image sensor consisting of a succession of one-line segments each including a blanking period is converted by means of an analog memory device into an analog picture signal of one-scan line suited to the transmission rate of the circuit line, said converter being characterized in that it comprises:
    first clock means for producing a high-speed clock of the rate corresponding to the picture-signal output rate of the solid-state image sensor;
    second clock means for producing a low-speed clock of the rate corresponding to the transmission rate of the circuit line;
    first counter means for counting the high-speed clock pulses from said first clock means and adapted to be reset at a specified full count;
    second counter means for counting the low-speed clock pulses from said second clock means and adapted to be reset at the same full count as that of said first counter means;
    means for producing a switching signal each time the output indications of said first and second counter means coincide with each other;
    a pair of analog memory devices having a predetermined number of memory elements for delaying and expanding said high-speed analog picture signal;
    means for distributing said high-speed picture signal alternately to one and the other of said analog memory devices under the control of said switching signal;
    means for reading out the output signal of said analog memory devices alternately under the control of said switching signal as the distribution of said high-speed picture signal to one or the other of said analog memory devices is interrupted; and
    shift-pulse feeding means coupled to each of said analog memory devices for shifting the contents of the memory elements of the analog memory device alternately at the rates of the high-speed and low-speed clocks, the switching between the high-speed and low-speed clocks being effected under the control of said switching signal from the high-speed to the low-speed clock each time the supply of said high-speed picture signal to the analog memory device is started and from the low-speed to the high-speed clock each time such signal supply to the analog memory device is interrupted.

2. A time-axis converter as set forth in claim 1, characterized in that it further comprises:
    means for generating a predetermined reference voltage;
    means for supplying a signal of said reference voltage to either of said analog memory devices when said high-speed picture signal is not being supplied to the analog memory device; and
    means for restoring the d-c level of the output signals of said analog memory devices by the use of said reference voltage signal included in said output signals.

3. A time-axis converter as set forth in claim 2, characterized in that said d-c level restoring means includes a capacitor, a resistance series-connected to said capacitor, an ideal rectifier circuit connected in parallel with said resistance, and a circuit for producing a restoration level of fixed voltage and connected to said ideal rectifier circuit.

* * * * *